United States Patent [19]

Tung

[11] 4,348,312

[45] Sep. 7, 1982

[54] ULTRA-HIGH-INDEX GLASS MICROSPHERES AND PRODUCTS MADE THEREFROM WITH A FLUOROPOLYMER AND AN ESTER POLYMER BLEND

[75] Inventor: Chi F. Tung, Mahtomedi, Washington County, Minn.

[73] Assignee: Minnesota Mining and Manufacturing Company, St. Paul, Minn.

[21] Appl. No.: 242,550

[22] Filed: Mar. 11, 1981

Related U.S. Application Data

[60] Continuation-in-part of Ser. No. 129,077, Mar. 10, 1980, abandoned, which is a division of Ser. No. 962,324, Nov. 20, 1980, Pat. No. 4,192,576.

[51] Int. Cl.$^3$ .................. C08K 3/40; C08L 27/16; C08L 33/12
[52] U.S. Cl. .................... 428/144; 524/520; 525/199; 523/172; 428/463; 428/483; 428/500; 428/433

[58] Field of Search ............... 525/199; 260/42.27

[56] References Cited

U.S. PATENT DOCUMENTS

| 3,340,222 | 9/1967 | Fang | 260/41 |
| 3,458,391 | 7/1969 | Miller | 161/189 |
| 3,790,645 | 2/1974 | Murayama et al. | 525/199 |
| 3,895,029 | 7/1975 | Ward | 525/199 |
| 4,091,055 | 5/1978 | Kidoh et al. | 525/199 |

*Primary Examiner*—Carman J. Seccuro
*Attorney, Agent, or Firm*—C. Alexander; D. M. Sell; R. R. Tamte

[57] ABSTRACT

Compositions comprising copolymers of methyl methacrylate and ethyl acrylate and of vinylidene fluoride and hexafluoropropylene may be blended to form transparent compositions of low refractive index, making them useful in retroreflective products as a layer in which glass microspheres are embedded.

5 Claims, 5 Drawing Figures

ULTRA-HIGH-INDEX GLASS MICROSPHERES AND PRODUCTS MADE THEREFROM WITH A FLUOROPOLYMER AND AN ESTER POLYMER BLEND

REFERENCE TO RELATED APPLICATIONS

This application is a continuation-in-part of application Ser. No. 129,077, filed Mar. 10, 1980, now abandoned which itself is a division of application Ser. No. 962,324, filed Nov. 20, 1980, and now issued as U.S. Pat. No. 4,192,576.

BACKGROUND OF THE INVENTION

Ever since the 1940's when retroreflective sheeting based on a monolayer of embedded microsphere-lens elements was introduced and came into widespread use, there has been a desire for glass microspheres having increased indexes of refraction. Referring to the illustration of embedded microsphere sheeting in FIG. 1 of the attached drawing, the higher the index of refraction of the microspheres (M) with respect to the index of refraction of the transparent flat-surfaced top layer (T), the thinner the transparent spacing layer (S) can be; and if the ratio of microsphere and top layer indices of refraction were high enough (slightly over 1.9), the spacing layer could be eliminated. Most transparent polymeric materials such as used for the top layer have an index of refraction around 1.5, which would call for microspheres having an index of refraction of about 2.9 in order to eliminate the spacing layer.

Despite the desire for high-index microspheres, the art has never, insofar as known, provided commercially useful glass microspheres having a refractive index higher than about 2.7. The highest-index prior-art microspheres have been based on large amounts of $Bi_2O_3$ or PbO, usually in combination with rather large amounts of $TiO_2$; see Beck et al, U.S. Pat. No. 2,726,161; Beck et al, U.S. Pat. No. 2,853,393, which teaches some PbO-$Bi_2O_3$-based examples having indices up to 2.67; and Stradley et al, U.S. Pat. No. 2,870,030, which teaches some $Bi_2O_3$-$TiO_2$-based examples having indices up to 2.59. None of these prior-art microspheres have been commercialized, for one reason, because the index of refraction obtained is not high enough to eliminate or sufficiently reduce the thickness of the spacing layer. Also, the PbO-containing products are now considered especially unsuited to commercial use for pollution reasons.

Searight et al, U.S. Pat. No. 3,560,074, states that glass microspheres made from 95-100 weight-percent $TiO_2$ would have a refractive index of 2.9, but insofar as known, glass microspheres of such composition or index have never been made available to the retroreflective sheeting art. British Pat. No. 1,472,431 teaches microspheres that comprise over 50 weight-percent polycrystalline titanium dioxide in anatase form, but no commercial microspheres of this type have been supplied.

A different prior-art approach to increased refractive index, taught in Tung et al, U.S. Pat. No. 3,149,016, is a process for heat-treating glass microspheres to cause a structural rearrangement within the microspheres. The structural rearrangement, which is suggested in the patent to be development of crystal nuclei, increases the index of refraction of the microspheres. The highest-index microspheres exemplified in the patent, having an index raised from 2.47 to 2.7 by the heat-treatment process, comprise 67.5 parts PbO, and, as noted above, this dependence on PbO limits the utility of the microspheres.

The heat-treatment process is used to prepare the microspheres that are used most extensively in commercial reflective sheeting of the type shown in FIG. 1. These microspheres, taught in Tung et al, U.S. Pat. No. 3,493,403, have an index of refraction of about 2.3, and a spacing layer is included in the sheeting.

An alternative search for high index is represented by teachings of composite spheres that use a lower-refractive-index shell on a higher-index core to achieve an effective index of 2.9; see Taylor, U.S. Pat. No. 2,713,286 (an outer glass layer is leached to make it porous and of lower-refractive index) and McKenzie, U.S. Pat. No. 3,025,764 (silica-based low-index material coated on higher-index core). However, composite microspheres have not come into use, at least partially because they are costly to make.

A different approach to eliminating a space coat is described in Bingham et al, U.S. Pat. No. 3,551,025, which teaches sheeting as shown in FIG. 1 having a highly fluorinated elastomeric top coat. The index of refraction of the fluorinated compositions is sufficiently low as to form a desired ratio with the refractive index of lower index glass microspheres. However, sheeting as described in the patent is costly and it has never come into widespread commercial use.

In sum, the art has never achieved on embedded-microsphere retroreflective sheeting of widespread commercial acceptability that eliminates or greatly reduces the thickness of the spacing layer. There would be many advantages to such an elimination or reduced thickness-economies in processing time and in the amount of materials needed; improvement in properties of the sheeting such as flexibility; avoidance of variations in reflective brightness that occur with the variations in thickness of the space coat that inevitably creep into a factory operation; and longer useful life of the sheeting by eliminating the effect of weathering on the space coat. Despite the strong motivation such advantages provide, no one has ever achieved them, and a major reason is the absence of commercially acceptable glass microspheres of high enough index of refraction.

SUMMARY OF THE INVENTION

The present invention provides for the first time, insofar as known, solid nonporous transparent glass microspheres free of any substantial proportion of PbO and having a refractive index of 2.7 or higher. These microspheres principally comprise 65-85 weight-percent $Bi_2O_3$ and 5-35 weight-percent $TiO_2$, though other ingredients may be included in amounts totaling up to about one-fourth of the composition by weight, preferably less than 10 percent. It has been found that when microspheres of this composition are heat-treated in the manner taught in the above-discussed U.S. Pat. No. 3,149,016, their index of refraction is increased to at least 2.7, and is preferred compositions to 2.75 or more. Insofar as known, these are the highest-index glass microspheres ever prepared, and they open the way to retroreflective sheeting and other retroreflective products of simplified construction and improved properties.

For example, space coats can be eliminated from retroreflective sheeting of the embedded-microsphere type shown in FIG. 1 by use of microspheres of the invention and top coats having a refractive index of 1.45 or less; and the latter can be obtained by mixing small amounts of lower-index polymeric ingredients such as fluorinated polymers with more conventional-index polymeric ingredients such as acrylic-based resins. An especially desirable low-index composition, not taught in any known prior art, comprises 1 to 99 weight-parts of a copolymer of methylmethacrylate and ethyl acrylate and 99 to 1 weight-parts of vinylidene fluoride and hexafluoropropylene. The methylmethacrylate and ethyl acrylate in the copolymer are generally in an approximately 3 to 1 ratio and the vinylidene fluoride and hexafluoropropylene are also in an approximately 3 to 1 ratio. The composition is usefully transparent throughout the range of proportions, though best results are generally obtained when the vinylidene fluoride-hexafluoropropylene copolymer is used in an amount of at least 50 weight-parts, and more preferably in a range of about 60 to 80 weight-parts.

Conventional space coats can also be eliminated even with 1.5-index top coats by vapor-depositing or otherwise forming very thin transparent layers on the microspheres. For example, low-index materials such as cryolite ($Na_3AlF_6$) vapor-deposited in thicknesses of about 2 micrometers or less are useful with microspheres of the invention. Such thin coatings can be vapor-deposited in uniform thicknesses, and they avoid many of the limitations of conventional, thicker space coats.

Microspheres of the invention are also useful in many other constructions besides retroreflective sheeting of the type shown in the drawing. For example, the microspheres can be hemispherically reflectorized in the manner taught in Palmquist et al, U.S. Pat. No. 2,963,378 (e.g., the microspheres are partially embedded into a carrier such as a polyethylene film; then vapor-coated with a specular reflector such as aluminum; and then removed from the carrier), to form reflective lens elements useful as an additive to transparent films to make the films retroreflective. Typically such films are formed by dispersing the reflective lens elements into a variety of liquid compositions that comprise a film-forming binder material and then coating, casting, or extruding, etc. the composition as either a coating on a substrate or an unsupported film. The reflective lens elements are useful when totally embedded in the film, and as a result will provide retroreflection whether wet or dry.

If the transparent films in which reflective lens elements are incorporated comprise a low-index binder material, the hemispherical reflector of the reflective lens elements can be in direct contact with the microspheres; if more conventional-index materials are used, a thin transparent layer can be vapor-deposited onto the microspheres before coating of the hemispherical reflector. Although the noted U.S. Pat. No. 2,963,378 contemplates a similar use of vapor-deposited space coats, the large thickness needed with the comparatively low-index microspheres available at the time of that teaching prevented effective commercial practice of such a technique. With microspheres of the invention the space coat can be thin enough, generally about two micrometers or less, to provide effective, adequately bonded space coats, thereby forming reflective lens elements useful to reflectorize a wide variety of transparent films.

DESCRIPTION OF THE DRAWINGS

As previously discussed.

DETAILED DESCRIPTION

Figure 1:
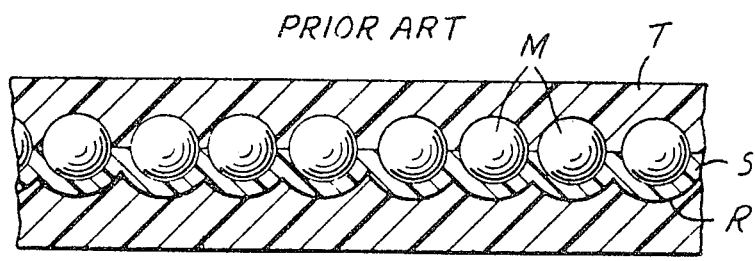
FIG. 1 is a sectional view through illustrative prior-art retroreflective sheeting which benefit from microspheres of the invention.

Glasses formed from mixtures of $Bi_2O_3$ and $TiO_2$ within the ranges 65–85 weight-percent $Bi_2O_3$ and corresponding 35–15 weight-percent $TiO_2$ have rather constant indexes of refraction of at least about 2.6 before, and 2.75 after, heat-treatment. However, as the amount of $Bi_2O_3$ is reduced below 70 weight-percent, and even more so as it is reduced below 65 weight-percent, the microspheres tend to become more refractory and of lower vitreosity. The result is it is more difficult to melt and form such compositions into spherical particles, and the microspheres formed may have nonglassy portions. On the other hand, as the amount of $Bi_2O_3$ approaches about 84 or 85 weight-percent, with a balance of $TiO_2$, the microspheres may opacify or crack during the heat-treating operation. $Bi_2O_3$ is a relatively expensive ingredient, and for that reason also, lower amounts are preferred.

Different substituents may be used to replace $Bi_2O_3$ or $TiO_2$. However, for such reasons as maintenance of high indexes of refraction and formation of transparent microspheres, either as formed or after heat-treatment, the amount of $TiO_2$ is held above about 5 weight-percent, and preferably is at least 20 weight-percent, especially for compositions that consist primarily of $Bi_2O_3$ and $TiO_2$. However, less than 35 weight-percent, and preferably less than 30 weight-percent $TiO_2$, are included to minimize the refractory character of the composition and to increase vitreosity.

$WO_3$ or $Nb_2O_3$, within a range of approximately 0 to 15–25 weight-percent make the composition somewhat more easy to melt and improve vitreosity, though they effect a slight reduction in index of refraction. Also, if pollution is not a predominant concern, PbO can be used as a substituent. Two ingredients that may be grouped with PbO as possible substituents in total amounts up to about 10 weight-percent are $Ta_2O_5$ and CdO.

Other ingredients can be present in the composition and undoubtedly will be at least as impurities. Some ingredients have a more harmful effect on properties than other ingredients. For example, $Na_2O$, $K_2O$, $Li_2O$, $B_2O_3$, $P_2O_5$, $GeO_2$, $Di_2O_3$, CaO, SrO, S, and $Sb_2O_3$ should generally not total more than about 1 percent by weight of a composition of the invention. In general, the more pure a composition of the invention, the higher the index of refraction, and techniques that introduce impurities, such as milling in a ceramic crucible, should be avoided. Other ingredients that are less harmful, but which also do not change the essential nature of the composition are $La_2O_3$, $ZrO_2$, $Sm_2O_3$, $SnO_2$, $SiO_2$, $Al_2O_3$, $Nd_2O_5$, $Pr_2O_3$, $BaO$, $Y_2O_3$, $ZnO$, $Mgo$, and $Ag_2O$, which may total up to about 5 weight-percent.

Coloring oxides can also be added to the composition to achieve particular daytime or nighttime coloring effects, but without otherwise changing the essential nature of the composition. For example, $CeO_2$, $CoO$, $CuO$, $NiO$, $U_2O_5$, $MnO_2$, $Cr_2O_3$, and $Fe_2O_3$ may be added generally in amounts less than about 10 weight-percent of the total composition.

(As is common in the glass art, the constituents of microspheres of the invention are described as oxides, which is the form in which they are presumed to exist in the completed microspheres, and which gives the proportions of chemical elements in the composition. In fact, the ingredients added to a preparation mixture may be in the form of some other chemical compound, such as carbonates or nitrates, and become modified to the oxide form during melting of the ingredients.)

Microspheres of the invention can be prepared by known processes; see Tung et al, U.S. Pat. No. 3,493,403, columns 5 and 6, which describe a method for first pulverizing and then intimately blending and sintering raw materials together; then crushing the sintered blend and screening to appropriate size; and then passing the screened particles through a flame, where they fuse and become spherulized.

The microspheres are then heated, e.g., by placing a tray of the microspheres in a furnace, or by moving them through the furnace on a conveyor belt. As taught in U.S. Pat. No. 3,149,016, the heat-treatment operation is understood as causing a structural rearrangement within the microspheres, such as a crystal nucleation. However, we do not restrict ourselves to this theory, but only note the effect on index of refraction that occurs through the heat-treatment.

Our experience is that sufficient heat should be applied to raise the individual microspheres to the temperature at which they undergo an exothermic reaction that is associated with the index-raising internal rearrangement of the microspheres. Probably the heat-treatment will be successful if the microspheres reach for even one second the lowest temperature at which the exothermic reaction occurs. The exothermic reaction for microspheres of the invention appears to occur within the temperature range 550° to 650° C., depending on composition.

It is important that the microspheres not be overheated, e.g., to a higher temperature at which a second exothermic reaction occurs, which appears to render the microspheres opaque. The second exothermic reaction generally occurs at temperatures of about 600° to 865° C., depending on composition. To prevent overheating, the microspheres should be rapidly heated and rapidly cooled; large masses of microspheres, in which accumulated heat from the first exothermic reaction might carry the microspheres to a temperature that initiates the second exothermic reaction, should be avoided.

Variable parameters of the heat-treatment operation include the time period of the treatment, the temperature of the gases or other media by which the microspheres are heated, and the quantity of the microspheres. These parameters can be varied empirically to arrive at satisfactory method controls.

After glass microspheres of the invention have been heat-treated, they show a distinctive profile during Differential Thermal Analysis (DTA, which gives the temperature profile of the microspheres as they are gradually heated above room temperature). The exothermic structural rearrangement that achieves an increase in index of refraction will cause a peak in the DTA temperature profile. However, this peak occurs at least primarily only the first time the beads are heated after they have been initially formed as spheres, i.e., during a heat-treatment operation as used to prepare microspheres of this invention. When microspheres that have previously been heat-treated are subjected to DTA, the same exothermic peak will not occur, since the exothermic internal structural rearrangement has already occurred during heat-treatment. Absence of an exothermic peak in the temperature interval 550°–650° C. in a DTA curve for microspheres of the invention is generally evidence that the microspheres have been heat-treated in a manner as contemplated by this invention.

If the microspheres are remelted and reformed into microspheres, they generally need to be heat-treated again to obtain the desired high index of refraction; during initial heating after reformation of the microspheres there will again be an exothermic peak in the DTA temperature profile.

The invention will be further illustrated with the following examples.

Particles of ingredients as listed in Tables I-V below were measured out and thoroughly mixed in a mortar and pestle. The dry powdered mixture was pressed into pellets at about 2500 pounds per square inch (1760 kilograms per square centimeter) and sintered at 600° C. The sintered pellets were crushed to particles of the desired microsphere size, formed into microspheres by passing through a flame, and screened to eliminate microspheres smaller than about 38 micrometers. The microspheres averaged about 44 micrometers.

The microspheres were heat-treated by placing them in a thin, approximately 3-millimeter-thick layer in a stainless-steel approximately 30-by-30-centimeter tray, placing the tray in a furnace which had been preheated to 640° C., removing the tray after 4 minutes, and allowing the tray and microspheres to cool rapidly in an open room to ambient temperature.

The indexes of refraction measure for the microspheres prepared are listed in Tables I-V. Although the microspheres of Examples 10 and 11 had a higher than desired percentage of opaqueness (generally, for satisfactory use, no more than 5 weight-percent of a batch of microspheres should be opaque), smaller-sized microspheres of the same composition would be of reduced opacity.

TABLE I

| Example No. | Ingredients (weight-percent) | | Index of Refraction | |
|---|---|---|---|---|
| | $Bi_2O_3$ | $TiO_2$ | As Formed | After Heat-Treatment |
| 1 | 84 | 16 | 2.60 | 2.75 Hazy |
| 2 | 83 | 17 | 2.60 | 2.75 |
| 3 | 82 | 18 | 2.60 | 2.75 |
| 4 | 81 | 19 | 2.60 | 2.75 |
| 5 | 80 | 20 | 2.60 | 2.75 |
| 6 | 78 | 22 | 2.60 | 2.75 |
| 7 | 77 | 23 | 2.60 | 2.75 |
| 8 | 75 | 25 | 2.59 | 2.75 |
| 9 | 70 | 30 | 2.59 | 2.74 5% opaque |
| 10 | 67.5 | 32.5 | 2.59 | 2.74 50% opaque |
| 11 | 65 | 35 | 2.59 | 2.74 80% opaque |

TABLE II

| Example No. | Ingredients (weight-percent) | | | Index of Refraction | |
|---|---|---|---|---|---|
| | $Bi_2O_3$ | $TiO_2$ | $WO_3$ | As Formed | After Heat-Treatment |
| 12 | 77 | 23 | 0 | 2.6 | 2.78 |
| 13 | 77 | 22 | 1 | 2.59 | 2.75 |
| 14 | 77 | 19 | 4 | 2.59 | 2.75 |
| 15 | 77 | 15 | 8 | 2.60 | 2.75 |
| 16 | 77 | 7 | 16 | 2.58 | 2.70 |
| 17 | 70 | 22 | 8 | 2.58 | 2.72 |
| 18 | 70 | 14 | 16 | 2.56 | 2.70 |
| 19 | 65 | 19 | 16 | 2.55 | 2.70 |
| 20 | 83 | 9 | 8 | 2.58 | 2.72 |
| 21 | 83 | 7 | 10 | 2.59 | 2.70 |
| 22 | 80 | 7 | 13 | 2.56 | 2.70 |

TABLE III

| Example No. | Ingredients (weight-percent) | | | Index of Refraction | |
|---|---|---|---|---|---|
| | $Bi_2O_3$ | $TiO_2$ | $Nb_2O_5$ | As Formed | After Heat-Treatment |
| 23 | 77 | 22 | 1 | 2.57 | 2.75 |
| 24 | 77 | 19 | 4 | 2.58 | 2.75 |
| 25 | 77 | 15 | 8 | 2.58 | 2.72 |
| 26 | 77 | 7 | 16 | 2.58 | 2.70 |
| 27 | 83 | 9 | 8 | 2.59 | 2.70 |
| 28 | 80 | 7 | 13 | 2.56 | 2.70 |

TABLE IV

| Ex. No. | Ingredients (weight-percent) | | | | Index of Refraction | |
|---|---|---|---|---|---|---|
| | $Bi_2O_3$ | $TiO_2$ | Additional Ingredient | Weight Percent | As Formed | After Heat Treatment |
| 29 | 77 | 23 | | | 2.60 | 2.78 |
| 30 | 77 | 22 | $La_2O_3$ | 1 | 2.565 | 2.725 |
| 31 | 77 | 21 | $La_2O_3$ | 2 | 2.565 | 2.725 |
| 32 | 77 | 22 | $ZrO_2$ | 1 | 2.565 | 2.75 |
| 33 | 77 | 19 | $ZrO_2$ | 4 | 2.565 | 2.75 |
| 34 | 77 | 22 | $Sn_2O_3$ | 1 | 2.585 | 2.75 |
| 35 | 77 | 22 | $SnO_2$ | 1 | 2.585 | 2.75 |
| 36 | 77 | 22 | $SiO_2$ | 1 | 2.585 | 2.75 |
| 37 | 77 | 21 | $SiO_2$ | 2 | 2.555 | 2.72 |
| 38 | 77 | 22 | $Al_2O_3$ | 1 | 2.56 | 2.72 |
| 39 | 77 | 21 | $Al_2O_3$ | 2 | 2.54 | 2.70 |
| 40 | 77 | 19 | $Al_2O_3$ | 4 | 2.53 | 2.69 |
| 41 | 77 | 22 | $Nd_2O_3$ | 1 | 2.585 | 2.75 |
| 42 | 67 | 23 | PbO | 10 | 2.60 | 2.78 |
| 43 | 77 | 22 | $Pr_2O_3$ | 1 | 2.565 | 2.75 |
| 44 | 77 | 22 | $Ta_2O_5$ | 1 | 2.58 | 2.76 |
| 45 | 77 | 19 | $Ta_2O_5$ | 4 | 2.565 | 2.72 |
| 46 | 77 | 22 | BaO | 1 | 2.59 | 2.75 |
| 47 | 77 | 22 | CdO | 1 | 2.58 | 2.73 |
| 48 | 77 | 19 | CdO | 4 | 2.55 | 2.70 |
| 49 | 77 | 22 | $Y_2O_3$ | 1 | 2.59 | 2.75 |
| 50 | 77 | 22 | ZnO | 1 | 2.59 | 2.75 |
| 51 | 77 | 22 | MgO | 1 | 2.57 | 2.72 |
| 52 | 76.2 | 22.8 | $Ag_2O$ | 1 | 2.56 | 2.74 |

TABLE V

| Example No. | Ingredients (weight-percent) | | | | Index of Refraction | | Color | |
|---|---|---|---|---|---|---|---|---|
| | $Bi_2O_3$ | $TiO_2$ | Additional Ingredient | Weight Percent | As Formed | After Heat-Treatment | As Formed | After Heat-Treatment |
| 53 | 77 | 23 | | | 2.6 | 2.78 | Yellow | Yellow |
| 54 | 77 | 22.95 | CoO | 0.05 | 2.565 | 2.75 | Green | Brown |
| 55 | 77 | 22.9 | CoO | 0.10 | 2.57 | 2.75 | Green | Brown |
| 56 | 77 | 22 | CoO | 1.0 | 2.565 | 2.75 | Black | Brown |
| 57 | 77 | 22.9 | CuO | 0.1 | 2.6 | 2.78 | Red | Red |
| 58 | 77 | 22 | CuO | 1.0 | 2.62 | 2.80 | Purple | Red |
| 59 | 77 | 22.9 | NiO | 0.1 | 2.58 | 2.75 | Olive | Olive |
| 60 | 77 | 22 | NiO | 0.1 | 2.585 | 2.75 | Brown | Brown |
| 61 | 77 | 22 | $V_2O_5$ | 1 | 2.62 | 2.78 | Brown | Lt. Red |
| 62 | 77 | 19 | $V_2O_5$ | 4 | 2.61 | 2.75 | Purple | Red |
| 63 | 77 | 22 | $MnO_2$ | 1 | 2.61 | 2.75 | Purple | Red |
| 64 | 77 | 22 | $MoO_3$ | 1 | 2.61 | 2.78 | Green | Orange |
| 65 | 77 | 19 | $MoO_3$ | 4 | 2.57 | 2.75 | Green | Orange |
| 66 | 76.9 | 23 | $Cr_2O_3$ | 0.1 | 2.6 | 2.78 | Yellow | Brown |
| 67 | 76.8 | 23 | $Cr_2O_3$ | 0.2 | 2.61 | 2.78 | Yellow | Brown |
| 68 | 76.6 | 23 | $Cr_2O_3$ | 0.4 | 2.62 | 2.78 | Green | Brown |
| 69 | 77 | 22 | $Cr_2O_3$ | 1 | 2.62 | 2.80 | Brown | Brown |
| 70 | 77 | 22 | $Fe_2O_3$ | 1 | 2.62 | 2.78 | Gold | Gold |
| 71 | 77 | 22 | $CeO_2$ | 1 | 2.62 | 2.78 | Brown | Orange |
| 72 | 77 | 21 | $CeO_2$ | 2 | 2.62 | 2.78 | Brown | Orange |
| 73 | 77 | 19 | $CeO_2$ | 4 | 2.62 | 2.78 | Brown | Orange |

EXAMPLES 74–76

Microspheres were prepared and heat-treated by the procedure of Examples 1–73 except that instead of pressing the powder into pellets after mixing in the mortar and pestle, it was passed through a flame. Some beads formed in the flame, but most of the powder sintered into particles which were then screened and passed through the flame again. The microspheres were then screened to a size range of 37 to 62 microns. The formulation and properties of the microspheres were as described in Table VI.

TABLE VI

| Ex. No. | Ingredients (weight-percent) | | | | | Index of Refraction | |
|---|---|---|---|---|---|---|---|
| | $Bi_2O_3$ | $TiO_2$ | $WO_3$ | $Nb_2O_3$ | PbO | As Formed | After Heat-Treatment |
| 74 | 77 | 23 | | | | 2.60 | 2.75 (10% opaque) |
| 75 | 70 | 10 | 15 | 5 | | 2.58 | 2.72 (20% opaque) |
| 76 | 65 | 10 | 15 | | 10 | 2.58 | 2.72 (20% opaque) |

EXAMPLE 77

Figure 2A:
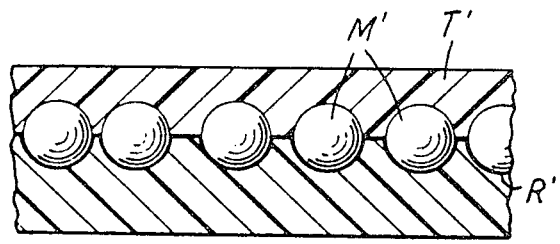
FIGS. 2(a) and 2(b) are sectional views through retroreflective sheeting of the invention, which have structural improvements over the sheeting of FIG. 1 achieved by use of microspheres of the invention; the thickness of the layers in the drawings may not be proportionate to their actual thickness for ease of illustration.

Reflective sheeting of the type shown in FIG. 2(a) was prepared by conventional process techniques, using microspheres M' of Example 7, and using as the material of the top layer T' a mixture of 30 weight-percent of an acrylic polymer solution (40 percent solids in 60 percent xylol; Rohm and Haas B-44) and 70 weight-percent of a solution of fluorinated rubber (33 percent solids in 67 percent xylol; duPont's "Viton A"). This mixture provided an index of refraction of about 1.43, but the index can be varied by varying the ratio of the ingredients.

EXAMPLE 78

Figure 2B:
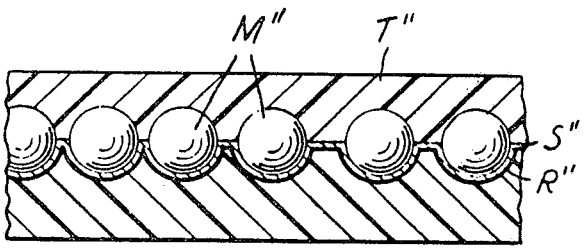

Reflective sheeting of the type shown in FIG. 2(b) was prepared with microspheres M" of Example 7 by using conventional process techniques except that the layer S" was prepared by vapor-coating a layer of cryolite in a 2-micrometer thickness onto the microspheres before vapor-deposition of a specularly reflective aluminum layer R".

EXAMPLE 79

Figure 3:
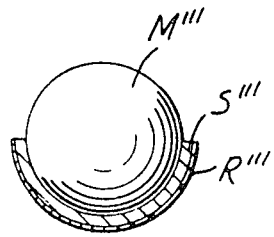
FIG. 3 is a sectional view through a somewhat idealized illustrative reflective lens element of the invention.

Reflective lens elements of the type shown in FIG. 3 were prepared by embedding a monolayer of M'" microspheres of Example 7 to their approximate equator in a polyethylene-coated carrier sheet; then vapor-depositing a layer S'" of cryolite to a 2-micrometer thickness; then vapor-depositing a layer R'" of aluminum onto the cryolite layer; and then removing the coated microspheres from the carrier sheet by scraping or buffing the sheet with a blade or rotary brush.

EXAMPLE 80

Figure 4:
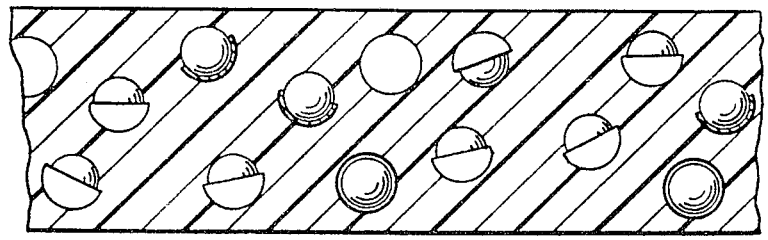
FIG. 4 is a sectional view through an illustrative transparent film incorporating reflective lens elements of the invention.

Reflective lens elements of Example 79 were incorporated into sheeting as shown in FIG. 4 by dispersing 10 parts by weight of the elements in 100 parts by weight of a vinyl organasol and coating the resulting composition with a knife coater onto a silicone-coated release liner in a 0.25-millimeter dry thickness.

EXAMPLES 81–85

Samples of reflective sheeting were prepared by first coating onto a polyethylene terephthalate film a set of compositions each comprising a mixture in different proportions, as listed in Table VII below, of an acrylate copolymer (comprising 71 weight-percent methyl methacrylate and 29 weight-percent ethyl acrylate; Acryloid B-44 from Rohm and Haas) and a vinylidene fluoride copolymer (comprising 75 weight-percent vinylidene fluoride and 25 weight-percent hexafluoropropylene; "Viton A" from du Pont). Glass microspheres having an index of refraction of about 2.6 were cascaded onto the coating while it was still liquid, whereupon the microspheres became partially embedded in the coating. A layer of specularly reflective aluminum was then vapor-coated onto the exposed surfaces of the microspheres. All samples of the sheetings were retroreflective when observed through the front surface of the sheeting (i.e., through the polyethylene terephthalate film). The sheeting of Example 84 had the brightest retroreflectivity.

Although the microspheres were only partially embedded in the blend of acrylate and vinylidene fluoride polymers, they could be completely embedded, i.e., by coating the blend over the back surfaces of the microspheres after the specularly reflective layer has been applied. The specularly reflective layer is generally applied directly to the microspheres, though a space coat can be used depending on the particular index of refraction of the blend and the microspheres. Also, hemispherically reflectorized glass microspheres (i.e., coated with specularly reflective metal) can be mixed into a coating composition in which a blend of the acrylate and vinylidene fluoride copolymers are used as the binder material, and the microspheres become directly embedded in the coated film, which may be self-supporting sheet (e.g., stripped from a release liner) or may be carried on a substrate. The presence of the vinylidene fluoride copolymer improves the flexibility of the product.

TABLE VII

| Example No. | Acrylate Copolymer | Vinylidene Fluoride Copolymer |
| --- | --- | --- |
| 81 | 10 percent | 90 percent |
| 82 | 20 percent | 80 percent |
| 83 | 30 percent | 70 percent |
| 84 | 40 percent | 60 percent |
| 85 | 50 percent | 50 percent |

What is claimed is:

1. Retroreflective film comprising a layer in which glass microspheres are at least partially embedded, said layer comprising a transparent blend of 1 to 99 weight-parts of a copolymer that comprises about 3 parts of methylmethacrylate and 1 part of ethyl acrylate and 99 to 1 weight-parts of a copolymer that comprises about 3 parts of vinylidene fluoride and 1 part of hexafluoropropylene.

2. Retroreflective film of claim 1 in which said layer comprises 1 to 50 weight-parts of the copolymer of methyl methacrylate and ethyl acrylate and 99 to 50 weight-parts of the copolymer of vinylidene fluoride and hexafluoropropylene.

3. Retroreflective film of claim 2 in which said layer comprises about 20 to 40 weight-parts of the copolymer of methylmethacrylate and ethyl acrylate and about 60 to 80 weight-parts of the copolymer of vinylidene fluoride and hexafluoropropylene.

4. Retroreflective film of claims 1, 2 or 3 in the form of a self-supporting sheet.

5. Coating composition that comprises a blend of 1 to 99 of weight-parts of a copolymer that comprises about 3 parts of methyl methacrylate and 1 part of ethyl acrylate and 99 to 1 weight-parts of a copolymer that comprises about 3 parts of vinylidene fluoride and 1 part of hexafluoropropylene and glass microspheres dispersed in the blend and hemispherically coated with specularly reflective metal.

* * * * *